US012802239B2

(12) United States Patent
Min et al.

(10) Patent No.: US 12,802,239 B2
(45) Date of Patent: Nov. 17, 2026

(54) DEEP LEARNING-BASED MOTION RECOGNITION METHOD AND SYSTEM USING MULTIPLE FEATURE INFORMATION

(71) Applicant: Korea Electronics Technology Institute, Seongnam-si (KR)

(72) Inventors: Kyoung Won Min, Seongnam-si (KR); Ganzorig Gankhuyag, Seoul (KR); Haeng Seon Son, Seongnam-si (KR); Seon Young Lee, Seoul (KR); Young Bo Shim, Seongnam-si (KR); Gi Ho Sung, Seongnam-si (KR); Jin Man Park, Gwangju-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 292 days.

(21) Appl. No.: 18/398,535

(22) Filed: Dec. 28, 2023

(65) Prior Publication Data

US 2025/0200761 A1 Jun. 19, 2025

(30) Foreign Application Priority Data

Dec. 18, 2023 (KR) ........................ 10-2023-0184806

(51) Int. Cl.
*G06T 7/246* (2017.01)
*G06T 7/215* (2017.01)
(Continued)

(52) U.S. Cl.
CPC .............. *G06T 7/246* (2017.01); *G06T 7/215* (2017.01); *G06V 10/25* (2022.01); *G06V 10/44* (2022.01);
(Continued)

(58) Field of Classification Search
CPC .......... G06T 7/215; G06T 7/246; G06V 10/62
See application file for complete search history.

(56) References Cited

U.S. PATENT DOCUMENTS

2022/0101007 A1* 3/2022 Kadav ........................ G06T 7/73
2022/0147736 A1* 5/2022 Chan .................. G06F 21/6245

FOREIGN PATENT DOCUMENTS

KR 10-2020-0011425 A 2/2020
KR 10-2021-0062256 A 5/2021

OTHER PUBLICATIONS

Zhang, Qipeng, et al., "Spatial-Temporal Transformer for Skeleton-Based Action Recognition", 2021 China Automation Congress (CAC), IEEE, 2021, (6 Pages in English).

(Continued)

*Primary Examiner* — Peter K Huntsinger
(74) *Attorney, Agent, or Firm* — NSIP Law

(57) ABSTRACT

There is provided a deep learning-based motion recognition method and system using multiple feature information. A motion recognition method according to an embodiment reshapes time-series image data obtained by shooting a target object to a type of image data of a spatial domain, extracts spatial features from the reshaped image data, reshapes the image data from which the spatial features are extracted to a type of time-series image data, integrates the time-series image data and time-series key point data of the target object, extracts temporal features from the integrated time-series data, and recognizes motions of the target object based on the extracted temporal features. Accordingly, motions can be more stably recognized even when there are a plurality of objects at the same time and an overlap, occlusion frequently occur, and lots of computations are not required and motion recognition can be performed in a small low-power edge device having relatively low computing power.

20 Claims, 6 Drawing Sheets

(51) Int. Cl.
*G06V 10/25* (2022.01)
*G06V 10/44* (2022.01)
*G06V 10/62* (2022.01)
*G06V 40/20* (2022.01)

(52) U.S. Cl.
CPC .............. *G06V 10/62* (2022.01); *G06V 40/20* (2022.01); *G06V 40/28* (2022.01); *G06V 2201/07* (2022.01)

(56) References Cited

OTHER PUBLICATIONS

Korean Office Action Issued on Oct. 30, 2024, in Counterpart Korean Patent Application No. 10-2023-0184806 (5 Pages in English, 7 Pages in Korean).

* cited by examiner

DEEP LEARNING-BASED MOTION RECOGNITION METHOD AND SYSTEM USING MULTIPLE FEATURE INFORMATION

CROSS-REFERENCE TO RELATED APPLICATION(S) AND CLAIM OF PRIORITY

This application is based on and claims priority under 35 U.S.C. § 119 to Korean Patent Application No. 10-2023-0184806, filed on Dec. 18, 2023, in the Korean Intellectual Property Office, the disclosure of which is herein incorporated by reference in its entirety.

BACKGROUND

Field

The disclosure relates to deep learning-based motion recognition, and more particularly, to a method and a system for efficiently recognizing continuous motions such as hand signals of a traffic officer.

Description of Related Art

A continuous motion recognition technology is a technology that recognizes motions by collecting continuous motion data by using various sensors and interpreting data, and the core function thereof is appropriately extracting feature information for motion recognition.

As shown in FIG. 1, a skeleton is constituted by using key points as feature information, and then, motions are cognized based on changes in the shape of the skeleton. However, when an overlap, occlusion occurs between key points according to motions, it is difficult to separate, identify positions of key points and thus there is a problem that accuracy of recognition is degraded.

To solve this problem, a slow fast method using features of an image has appeared, which is illustrated in FIG. 2. As shown in FIG. 2, the slow fast method includes a slow pathway operating at a low frame rate speed to detect spatial features, and a fast pathway operating at a high frame rate speed to detect changes in temporal features.

However, the fast pathway is highly likely to fail to recognize motions that are not well expressed in an image since it uses only image data, and two types of pathways are constituted and thus there is a problem that much time and high power consumption are required due to lots of computations.

SUMMARY

The disclosure has been developed in order to solve the above-described problems, and an object of the disclosure is to provide a method and a system for recognizing motions by using all of spatial features and temporal features regarding image data, and features of key point data, as a solution for enabling motion recognition to be performed in a small low-power edge device having relatively low computing power, and enhancing motion recognition performance.

To achieve the above-described object, a motion recognition method according to an embodiment of the disclosure may include: a first reshaping step of reshaping time-series image data obtained by shooting a target object to a type of image data of a spatial domain; a first extraction step of extracting spatial features from the reshaped image data; a second reshaping step of reshaping the image data from which the spatial features are extracted to a type of time-series image data; a step of integrating the time-series image data and time-series key point data of the target object; a second extraction step of extracting temporal features from the integrated time-series data; and a step of recognizing motions of the target object based on the extracted temporal features.

The time-series image data may be time-series image data of a bounding box through which the target object is detected.

The first reshaping step may include reshaping the time-series image data to the type of image data of the spatial domain according to the following equation:

$$I_f^{(B\times Seq,C,W,H)} = \text{reshape}\left(I^{(B,Seq,C,W,H)}\right)$$

where $I_f^{(B\times Seq,C,W,H)}$ is image data of a spatial domain, $I^{(B,Seq,C,W,H)}$ is time-series image data, B is a batch size, Seq is sequence data, C is a channel, W is a width, and H is a height.

The second reshaping step may include reshaping the image data from which the spatial features are extracted to the type of time-series image data according to the following equation:

$$I_{seq}^{(B,Seq,dim0)} = \text{reshape}\left(X^{(B\times Seq,dim0)}\right)$$

where $I_{seq}^{(B,Seq,dim0)}$ is time-series image data, $X^{(B\times Seq,dim0)}$ is image data from which spatial features are extracted, and dim0 is a dimension of image data from which spatial features are extracted.

The second extraction step may include extracting the temporal features from the integrated time-series data by using a transformer encoder.

According to an embodiment, the motion recognition method may further include a step of adding an index and position information of each key point to the time-series key point data.

The step of adding may include: generating an index of each key point through input embedding; and generating position information of each key point through positional encoding.

The step of integrating may include integrating the time-series image data and the time-series key point data by concatenating.

The target object may be a traffic officer, and the motions may be hand signals.

According to another embodiment of the disclosure, a motion recognition system may include: a first extraction unit configured to reshape time-series image data obtained by shooting a target object to a type of image data of a spatial domain, and to extract spatial features from the reshaped image data; a second reshaping unit configured to reshape the image data from which the spatial features are extracted to a type of time-series image data; an integration unit configured to integrate the time-series image data and time-series key point data of the target object; a second extraction unit configured to extract temporal features from the integrated time-series data; and a recognition unit configured to recognize motions of the target object based on the extracted temporal features.

According to still another embodiment of the disclosure, a motion recognition method may include: a first extraction step of extracting spatial features from time-series image data obtained by shooting a target object; a step of integrating the time-series image data from which the spatial features are extracted, and time-series key point data of the target object; a second extraction step of extracting temporal features from the integrated time-series data; and a step of recognizing motions of the target object based on the extracted temporal features.

According to yet another embodiment of the disclosure, a motion recognition system may include: a first extraction unit configured to extract spatial features from time-series image data obtained by shooting a target object; an integration unit configured to integrate the time-series image data from which the spatial features are extracted, and time-series key point data of the target object; a second extraction unit configured to extract temporal features from the integrated time-series data; and a recognition unit configured to recognize motions of the target object based on the extracted temporal features.

As described above, according to embodiments of the disclosure, motions may be recognized by using all of spatial features and temporal features regarding image data, and features of key point data, so that motions can be more stably recognized even when there are a plurality of objects at the same time and an overlap, occlusion frequently occur.

According to embodiments of the disclosure, spatial features and temporal features regarding image data are embedded in sequence, so that lots of computations are not required and motion recognition can be performed in a small low-power edge device having relatively low computing power.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, the disclosure will be described in more detail with reference to the accompanying drawings.

Embodiments of the disclosure provide a deep learning-based motion recognition method and system using multiple feature information.

The disclosure relates to a technology for recognizing motions that are frequently occluded by other objects, such as hand signals of a traffic officer, by using all of spatial features and temporal features regarding image data, and features of key point data, and for recognizing motions by few computations by embedding spatial features and temporal features for image data in sequence.

Figure 1:
FIG. 1 (Related Art)
FIG. 1 is a view illustrating an example of key point-based motion recognition.
Figure 2:
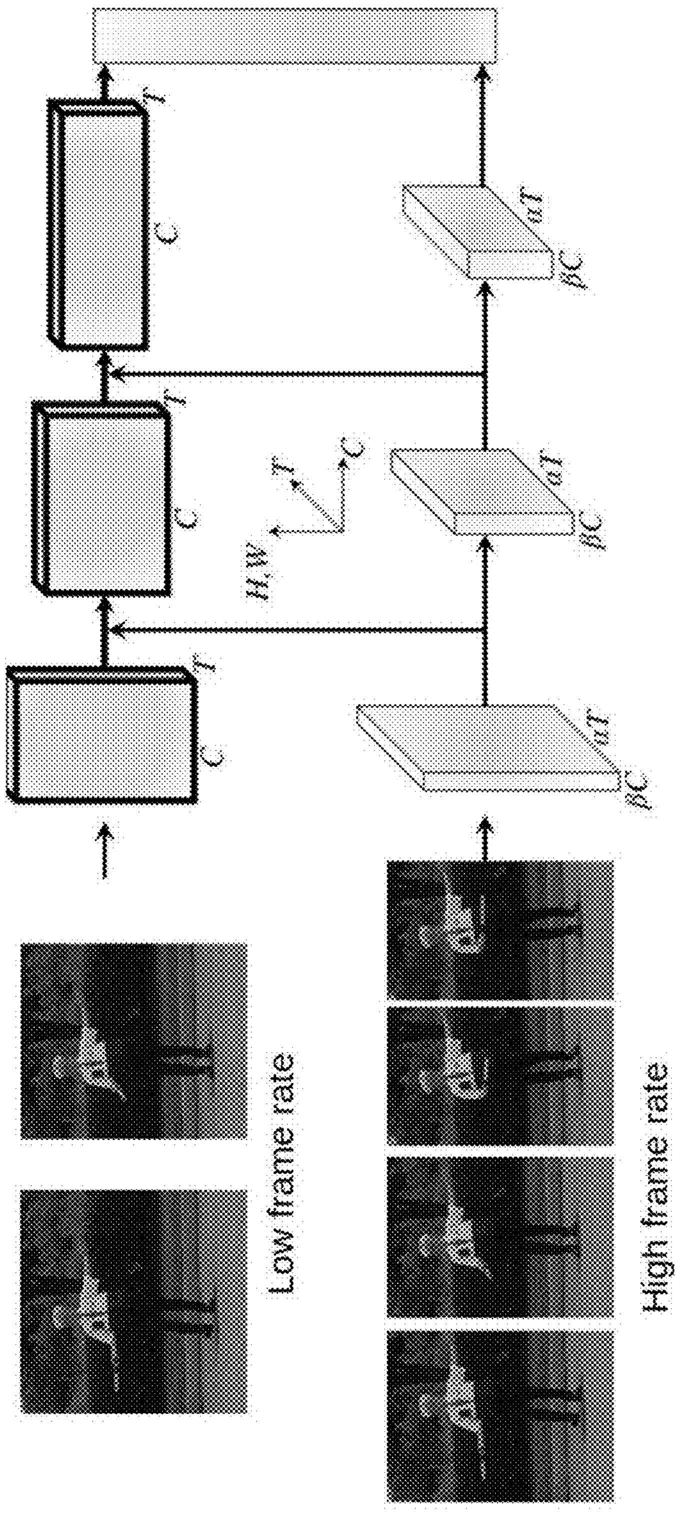
FIG. 2 (Related Art)
FIG. 2 is a view illustrating a slow fast method.
Figure 3:
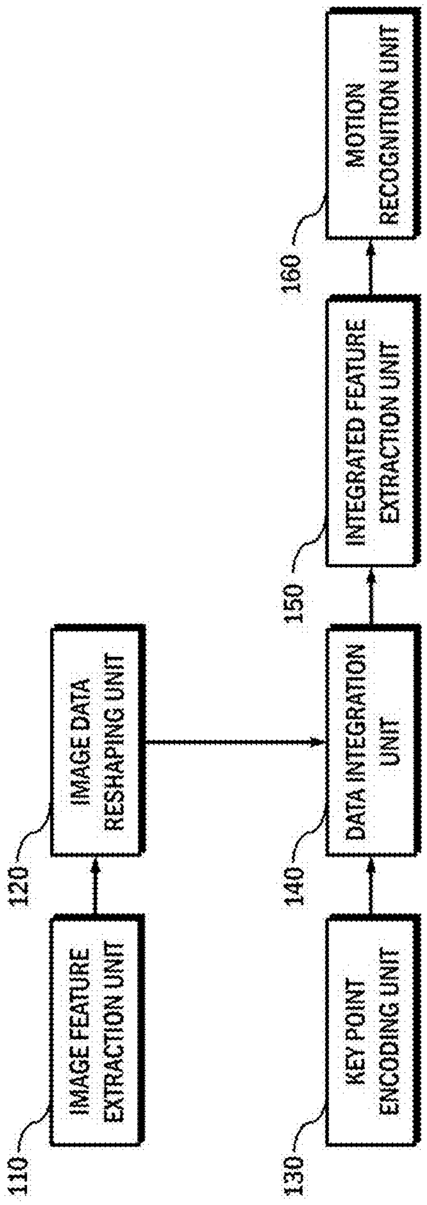
FIG. 3 is a view illustrating a motion recognition system according to an embodiment of the disclosure.

FIG. 3 is a view illustrating a configuration of a motion recognition system according to an embodiment of the disclosure. As shown in FIG. 3, the motion recognition system according to an embodiment may include an image feature extraction unit 110, an image data reshaping unit 120, a key point encoding unit 130, a data integration unit 140, an integrated feature extraction unit 150, and a motion recognition unit 160.

Figure 4:
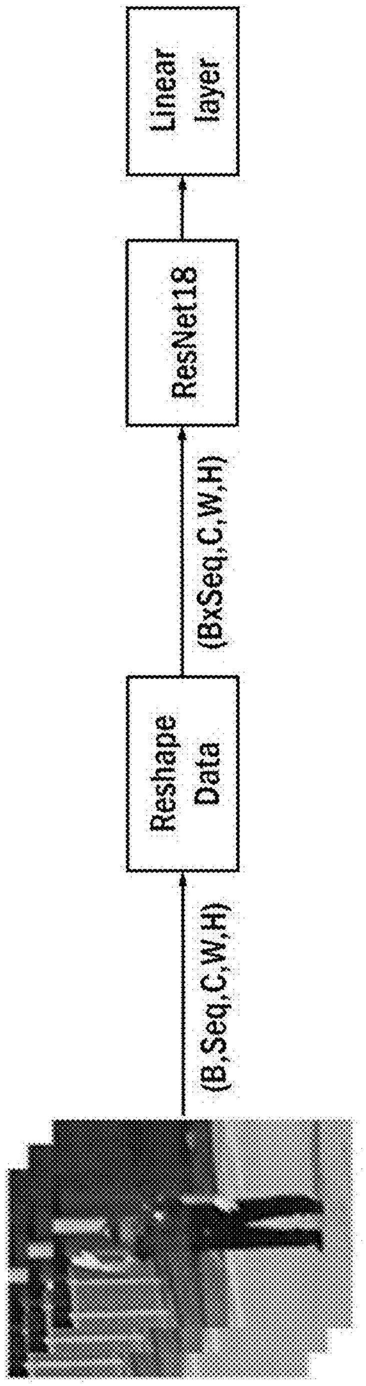
FIG. 4 is a view illustrating a detailed structure of an image feature extraction unit.

The image feature extraction unit 110 may receive time-series image data that is obtained by cutting only a bounding box through which a target object is detected from time-series data (image sequences) obtained by shooting the target object, and may extract spatial features. FIG. 4 illustrates a detailed structure of the image feature extraction unit 110.

As shown in FIG. 4, the image feature extraction unit 110 may reshape the time-series image data to a type of image data of a spatial domain, first, in order to extract spatial features from the time-series image data. An equation for reshaping may be expressed by the following equation 1:

$$I_f^{(B\times Seq,C,W,H)} = \text{reshape}\left(I^{(B,Seq,C,W,H)}\right) \quad \text{Equation 1}$$

where $I_f^{(B\times Seq,C,W,H)}$ is image data of a spatial domain, $I^{(B,Seq,C,W,H)}$ is time-series image data, B is a batch size, Seq is sequence data, C is a channel, W is a width, and H is a height.

This process is a process for reshaping a type of image data of a temporal domain to a type of image data of a spatial domain, and also is a process of transforming 5D data (batch size, sequence, channel, width, height) into 4D data (B×Seq, Channel, W, H).

Next, the image feature extraction unit 110 extracts features in a spatial domain, that is, spatial features, from the reshaped image data (spatial domain feature extraction). The spatial domain feature extraction may be performed by using a lightweight deep learning network such as ResNet 18, EfficientNetB0, Mobilenet, and MobilenetV2.

Referring back to FIG. 3, the image data reshaping unit 120 reshapes the image data of the spatial domain from which features are extracted by the image feature extraction unit 110 to a type of time-series image data which is image data of a temporal domain. An equation for reshaping may be expressed by the following Equation 2:

$$I_{seq}^{(B,Seq,dim0)} = \text{reshape}\left(X^{(B\times Seq,dim0)}\right) \quad \text{Equation 2}$$

where $I_{seq}^{(B,Seq,dim0)}$ is time-series image data, $X^{(Bx\ Seq,dim0)}$ is image data of a spatial domain from which features are extracted, and dim0 is a dimension of image data of a spatial domain from which features are extracted.

Figure 5:
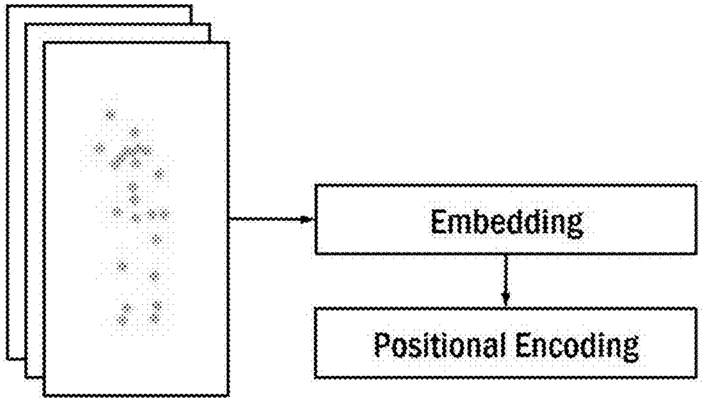
FIG. 5 is a view illustrating a detailed structure of a key point encoding unit.

Meanwhile, the key point encoding unit 130 may receive time-series key point data that is extracted from the time-series image data which is obtained by cutting only the bounding box through which the target object is detected from the time-series image data obtained by shooting the target object, and may encode the time-series key point data. FIG. 5 illustrates a detailed structure of the key point encoding unit 130.

As shown in FIG. 5, the key point encoding unit 130 may add an index and position information of each key point to time-series key point data. To achieve this, the index of each key point may be generated through input embedding, and the position information of each key point may be generated through positional encoding.

The key point data should be processed by a transformer encoder which will be described below. However, since the transformer encoder does not process data in sequence, the index and the position information are added to the key point data.

Encoded time-series key point data may be expressed by $I_{key}^{(B,Seq,dim1)}$. Herein, dim1 indicates a dimension of encoded time-series key point data.

Referring back to FIG. 3, the data integration unit 140 integrates the time-series image data from which spatial features are extracted, outputted from the image data reshaping unit 120, and the time-series key point data which is encoded by the key point encoding unit 130. Integration is performed by concatenating, and may be expressed by the following Equation 3:

$$I_{uf}^{(B,Seq,dim2)} = \text{concate}\left(I_{seq}^{(B,Seq,dim0)}, I_{key}^{(B,Seq,dim1)}\right) \quad \text{Equation 3}$$

where $I_{uf}^{(B,Seq,dim2)}$ is integrated time-series data, $I_{seq}^{(B,Seq,dim0)}$ is time-series image data from which spatial features are extracted, $I_{key}^{(B,Seq,dim1)}$ is encoded time-series key point data, B is a batch size, Seq is sequence data, and dim2 is a dimension of integrated time-series data.

Figure 6:
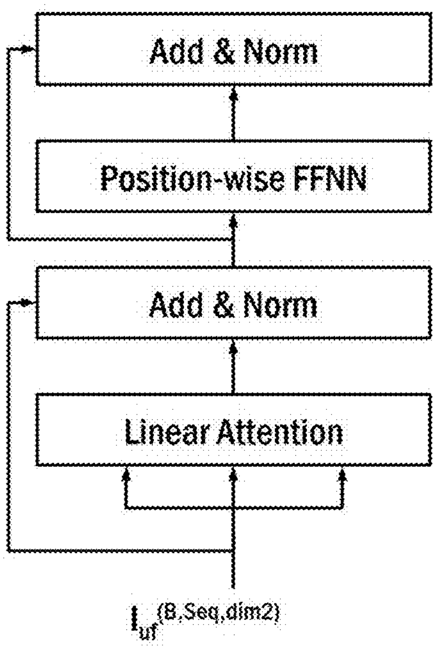
FIG. 6 is a view illustrating a lightweight transformer encoder.

The integrated feature extraction unit 150 extracts temporal features from the time-series data integrated by the data integration unit 140. Temporal domain feature extraction may be performed by using a lightweight transformer encoder. A lightweight transformer encoder is illustrated in FIG. 6.

Referring back to FIG. 3, the motion recognition unit 160 recognizes motions of the target object, based on the temporal features extracted by the integrated feature extraction unit 150. The motion recognition unit 160 may be implemented by a multi-layer perceptron (MLP).

Figure 7:
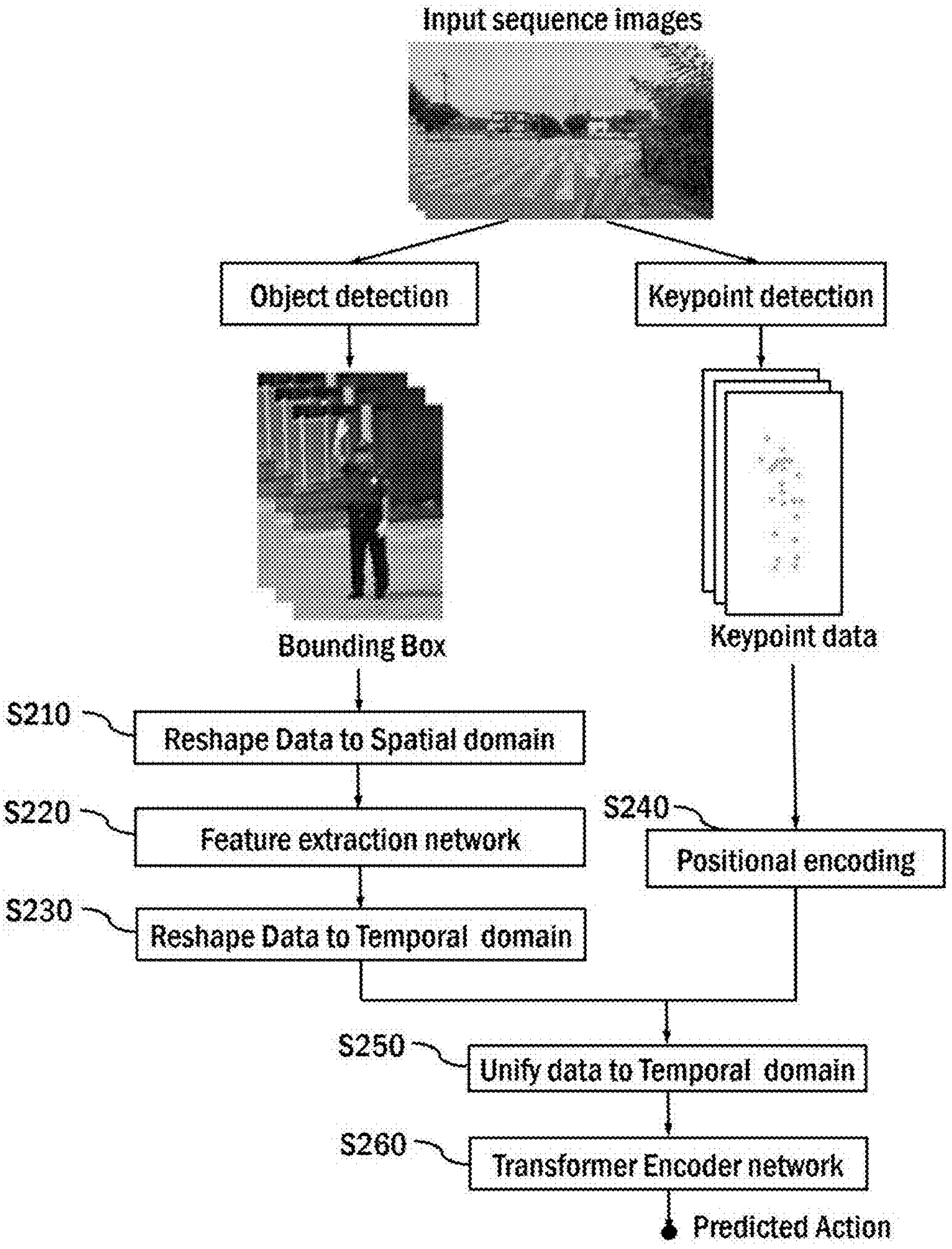
FIG. 7 is a view illustrating a motion recognition method according to another embodiment of the disclosure.

FIG. 7 is a flowchart illustrating a motion recognition method according to another embodiment of the disclosure.

To recognize motions, the image feature extraction unit 110 reshapes time-series image data that is obtained by cutting only a bounding box through which a target object is detected from time-series image data obtained by shooting the target object to a type of image data of a spatial domain (S210).

The image feature extraction unit 110 extracts spatial features from the image data reshaped in step S210 (S220), and the image data reshaping unit 120 reshapes the image data from which the spatial features are extracted in step S220 to a type of time-series image data which is image data of a temporal domain (S230).

Meanwhile, the key point encoding unit 130 encodes time-series key point data that is extracted from the time-series image data which is obtained by cutting only the bounding box through which the target data is detected from the time-series image data obtained by shooting the target object, and adds an index and position information of each key point (S240).

The data integration unit 140 integrates the time-series image data from which the spatial features are extracted and which is reshaped in step S230, and the time-series key point data which is encoded in step S240 (S250).

Thereafter, the integrated feature extraction unit 150 extracts temporal feature from the time-series data integrated in step S250, and the motion recognition unit 160 recognizes motions of the target object based on the extracted temporal features (S260).

Up to now, a deep learning-based motion recognition method and system using multiple feature information has been described in detail with reference to preferred embodiments.

In the above-described embodiments, motions that are frequently occluded by other objects, such as hand signals of a traffic officer, can be recognized by using all of spatial features and temporal features regarding image data, and features of key point data, and motions can be recognized by few computations by embedding spatial features and temporal features for image data in sequence.

The technical concept of the disclosure may be applied to a computer-readable recording medium which records a computer program for performing the functions of the apparatus and the method according to the present embodiments. In addition, the technical idea according to various embodiments of the disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the at without departing from the scope of the present disclosure claimed in claims, and also, changed embodiments should not be understood as being separate from the technical idea or prospect of the present disclosure.

What is claimed is:

1. A motion recognition method comprising:

reshaping time-series image data obtained by shooting a target object to a type of image data of a spatial domain;

extracting spatial features from the reshaped image data;

reshaping the image data from which the spatial features are extracted to a type of time-series image data;

integrating the time-series image data and time-series key point data of the target object;

extracting temporal features from the integrated time-series data; and recognizing motions of the target object based on the extracted temporal features, wherein the reshaping time-series image data comprises reshaping the time-series image data to the type of image data of the spatial domain according to a following equation:

$$I_f^{(B\times Seq,C,W,H)} = \text{reshape}\left(I^{(B,Seq,C,W,H)}\right)$$

where $$I_f^{(B\times Seq,C,W,H)}$$

is image data of a spatial domain, $I^{(B,Seq,C,W,H)}$ is time-series image data, B is a batch size, Seq is sequence data, C is a channel, W is a width, and H is a height.

2. The motion recognition method of claim 1, wherein the time-series image data is time-series image data of a bounding box through which the target object is detected.

3. The motion recognition method of claim 1, wherein the reshaping the image data comprises reshaping the image data from which the spatial features are extracted to the type of time-series image data according to a following equation:

$$I_{seq}^{(B,Seq,dim0)} = \text{reshape}\left(X^{(B\times Seq,dim0)}\right)$$

where $$I_{seq}^{(B,Seq,dim0)}$$

is time-series image data, $X^{(B\times Seq,dim0)}$ is image data from which spatial features are extracted, and dim0 is a dimension of image data from which spatial features are extracted.

4. The motion recognition method of claim 1, wherein the extracting temporal features comprises extracting the temporal features from the integrated time-series data by using a transformer encoder.

5. The motion recognition method of claim 1, further comprising adding an index and position information of each key point to the time-series key point data.

6. The motion recognition method of claim 5, wherein the adding comprises:

generating an index of each key point through input embedding; and generating position information of each key point through positional encoding.

7. The motion recognition method of claim 1, wherein the integrating comprises integrating the time-series image data and the time-series key point data by concatenating.

8. The motion recognition method of claim 1, wherein the target object is a traffic officer, and the motions are hand signals.

9. A motion recognition system comprising:

one or more processors configured to:

reshape time-series image data obtained by shooting a target object to a type of image data of a spatial domain, and to extract spatial features from the reshaped image data;

reshape the image data from which the spatial features are extracted to a type of time-series image data;

integrate the time-series image data and time-series key point data of the target object;

extract temporal features from the integrated time-series data; and recognize motions of the target object based on the extracted temporal features, wherein, for the reshaping time-series image data, the one or more processors are configured to reshape the time-series image data to the type of image data of the spatial domain according to a following equation:

$$I_f^{(B\times Seq,C,W,H)} = \text{reshape}\left(I^{(B,Seq,C,W,H)}\right)$$

where $$I_f^{(B\times Seq,C,W,H)}$$

is image data of a spatial domain, $I^{(B,Seq,C,W,H)}$ is time-series image data, B is a batch size, Seq is sequence data, C is a channel, W is a width, and H is a height.

10. The system of claim 9, wherein the time-series image data is time-series image data of a bounding box through which the target object is detected.

11. The system of claim 9, wherein the one or more processors are configured to reshape the image data from which the spatial features are extracted to the type of time-series image data according to a following equation:

$$I_{seq}^{(B,Seq,dim0)} = \text{reshape}\left(X^{(B\times Seq,dim0)}\right)$$

where $$I_{seq}^{(B,Seq,dim0)}$$

is time-series image data, $X^{(B\times Seq,dim0)}$ is image data from which spatial features are extracted, and dim0 is a dimension of image data from which spatial features are extracted.

12. The system of claim 9, wherein, for the extracting temporal features, the one or more processors are configured to extract the temporal features from the integrated time-series data by using a transformer encoder.

13. The system of claim 9, wherein the one or more processors are further configured to add an index and position information of each key point to the time-series key point data.

14. The system of claim 13, wherein, for the adding, the one or more processors are further configured to:

generate an index of each key point through input embedding; and generate position information of each key point through positional encoding.

15. The system of claim 9, wherein, for the integrating, the one or more processors are configured to integrate the time-series image data and the time-series key point data by concatenating.

16. The system of claim 9, wherein the target object is a traffic officer, and the motions are hand signals.

17. A motion recognition method comprising:

reshaping time-series image data obtained by shooting a target object to a type of image data of a spatial domain according to a following equation:

$$I_f^{(B\times Seq,C,W,H)} = \text{reshape}\left(I^{(B,Seq,C,W,H)}\right)$$

where $$I_f^{(B\times Seq,C,W,H)}$$

is image data of a spatial domain, $I^{(B,Seq,C,W,H)}$ is time-series image data, B is a batch size, Seq is sequence data, C is a channel, W is a width, and H is a height;

extracting spatial features from the reshaped image data;

reshaping the image data from which the spatial features are extracted to a type of time-series image data according to a following equation:

$$I_{seq}^{(B,Seq,dim0)} = \text{reshape}\left(X^{(B\times Seq,dim0)}\right)$$

where $$I_{seq}^{(B,Seq,dim0)}$$

is time-series image data, $X^{(B\times Seq,dim0)}$ is image data from which spatial features are extracted, and dim0 is a dimension of image data from which spatial features are extracted;

integrating the time-series image data from which the spatial features are extracted, and time-series key point data of the target object;

extracting temporal features from the integrated time-series data; and recognizing motions of the target object based on the extracted temporal features.

18. The motion recognition method of claim 17, wherein the extracting temporal features comprises extracting the temporal features from the integrated time-series data by using a transformer encoder.

19. The motion recognition method of claim 17, further comprising adding an index and position information of each key point to the time-series key point data.

20. The motion recognition method of claim 19, wherein the adding comprises:

generating an index of each key point through input embedding; and generating position information of each key point through positional encoding.

* * * * *